July 19, 1960  C. LA DONA  2,945,727
EMERGENCY BRAKING SYSTEMS
Filed Oct. 28, 1955

INVENTOR
Clyde LaDona

United States Patent Office 2,945,727
Patented July 19, 1960

2,945,727

EMERGENCY BRAKING SYSTEMS

Clyde La Dona, Prospect Road, Pittsburgh 27, Pa.

Filed Oct. 28, 1955, Ser. No. 543,336

5 Claims. (Cl. 303—63)

This invention relates to emergency braking systems and particularly to a vehicle braking system which will operate when conventional braking systems fail. There have been many serious accidents over the years by reason of brake failures on trucks and trailers. Many of these failures are caused by failure of the air brake system through breaks in the line leading from the main tank to the wheel diaphragms, the failure of the main cylinder itself or simply by failure to obtain or maintain a sufficiently high air pressure to properly apply the brakes.

The present invention provides an emergency braking system particularly suitable for trucks and trailers and like wheeled vehicles using fluid pressure brake systems e.g. air brake systems. I provide a source of fluid under pressure, brake actuator means receiving fluid from the source of fluid under pressure, a fluid pressure reservoir receiving fluid from the source of fluid under pressure, check valve means restricting fluid flow from the source of fluid under pressure to the fluid pressure reservoir in one direction, valve means communicating with the fluid pressure reservoir normally carrying fluid from the source of fluid under pressure to the brake actuator means and electrical means actuating the valve means to prevent flow from the source of fluid under pressure to the brake actuating means while carrying fluid from the fluid pressure tank to the brake. Preferably the electrical means are responsive to a drop in fluid pressure below a predetermined level. The valve means is preferably a diaphragm valve normally carrying fluid from the source of fluid under pressure to the brake actuating means and sealing off the fluid pressure reservoir. A solenoid is provided to cause the diaphragm to shift from its normal position to stop the flow of fluid from the source of fluid under pressure and to carry fluid from the fluid pressure tank to the brake actuating means. The source of fluid under pressure is preferably a conventional air compressor and main supply tank.

While I have outlined certain salient features, advantages and objects of my invention hereinabove, other features, advantages, and objects will become apparent from a consideration of the following description of a preferred embodiment of this invention and the accompanying drawings in which—

Figure 1:
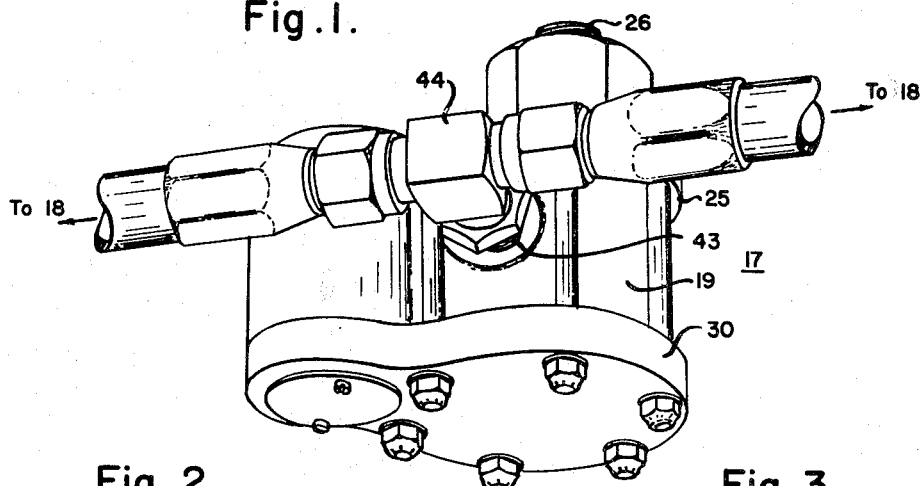
Figure 1 is an isometric view of a valve according to this invention.
Figure 2:
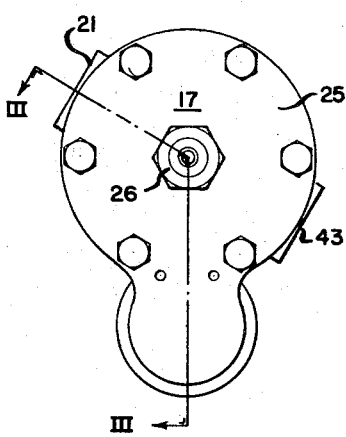
Figure 2 is an end elevation of the valve of Figure 1.

Referring to the drawings I have diagrammatically illustrated an air brake system having a compressor 10 supplying and maintaining air under pressure in a main supply tank 11. A brake pedal valve 12 controls the flow of air through a line 13 to a tractor relay valve 14. An auxiliary tank 15 receives air under pressure from the main supply tank 11 through a check valve 16. An electrically controlled valve 17 (hereafter described in detail) receives air from the relay valve 14 and normally transmits it directly to the diaphragms 18 which actuate the brakes on the tractor wheels. The valve 17 is connected to the auxiliary tank 15 and normally holds the air therein against passage to the diaphragms 18.

Figure 3:
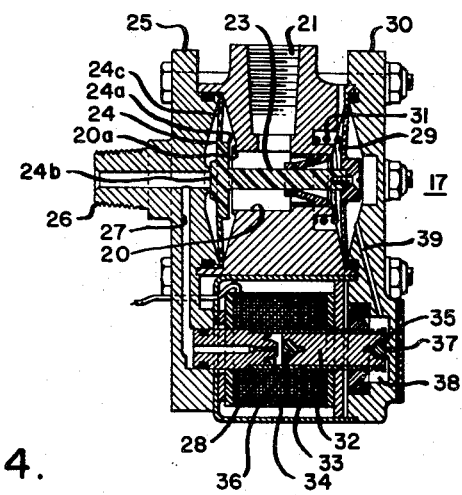
Figure 3 is a section on the line III—III of Figure 2.

The valve 17 is made up of a generally cylindrical central body portion 19 having an axial bore 20 of stepped section. A side opening 21 opens into the central bore and connects with the line 22 from the tractor relay valve so as to receive air therefrom. A spool shaped piston 23 is axially movable in the bore 20. A circular valving diaphragm 24 is formed on one end of the piston 23 and the outer ends are clamped between the body portion 19 and an end member 25. The end member 25 is provided with a hollow threaded nipple 26 axially aligned with the bore 20 and connected to the auxiliary tank to receive air therefrom. A by pass line 27 connects the opening through the nipple 26 with a solenoid valve seat 28. Both the body portion 19 and the end member 25 are provided with cup shaped recesses within which the diaphragm 24 moves. A second circular diaphragm 29 is mounted on the opposite end of the piston 23, and its edges are clamped between the valve body portion 19 and an end member 30. A spring 31 is provided between the body portion 19 and the diaphragm 29 normally urging the diaphragm away from the body portion (toward the right viewing Figure 3). Cup shaped depressions or recesses in both the body portion 19 and the end member 30 permit movement of the diaphragm 29. A sliding valve 32 is mounted in a sleeve 33 generally parallel to the bore 23 sufficiently loosely to permit free movement therein and to permit air to bypass around it from the valve 28 to chamber 38. An electrically actuated coil 34 surrounds the sleeve 33 and acts on the valve 32 to move it in the sleeve 33. The valve 32 is provided with seats 35 and 36 at opposite ends. The seat 35 normally closes passage 37 opening through the end member 30 from chamber 38 to atmosphere by reason of the differential pressure of air on the ends of valve 32. The seat 36 closes the solenoid valve seat 28 when the coil 34 is energized. A by pass line 39 connects the cup shaped recess in the end member 30 with chamber 38.

Figure 4:
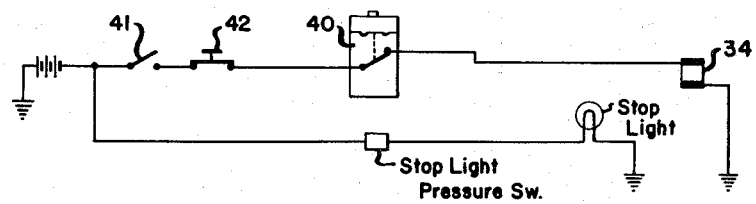
Figure 4 is a diagram of the electrical circuit of the brake system of this invention.
Figure 5:
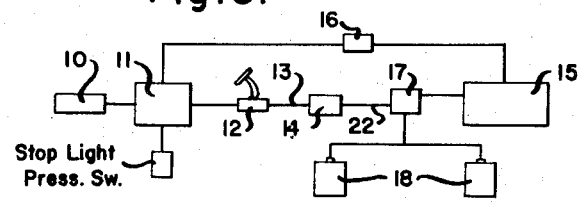
Figure 5 is a diagram of the fluid pressure system of this invention.

The electrical connections to the coil 34 are shown in Figure 4. A pressure switch 40 is connected to one side of a conventional ignition switch 41 through a normally closed override switch 42. The pressure switch is in turn connected to the coil 34 and from that to ground.

The operation of the braking system of this invention is as follows: Air from the compressor 10 passes to the main supply tank 11 where it is stored until needed. Air from the supply tank 11 passes to the auxiliary tank 15 through the check valve 16 whenever the pressure in the supply tank 11 exceeds that in the auxiliary tank 15. In this way the pressure of air in the auxiliary tank 15 is equal to the highest pressure attained in the system during any given period. The air in this auxiliary tank is not used in the normal operation of the brake system. When the brakes are applied in the normal way the brake pedal 12 is depressed permitting air to flow from the supply tank 11 through the relay valve 14 into the inlet opening 21 of the valve 17. The air entering through inlet opening 21 normally passes into the bore 20, through the valve seat 20a on the end of the bore 20 above the diaphragm 24 on the piston 23 and out through the outlet opening 43 in the valve 17. Air leaving the outlet 43 enters a T-fitting 44 from which it goes to the brake actuating diaphragms 18 on the tractor wheels. If the pressure in the brake system falls below a predetermined safe level the pressure switch 40 responsive to pressure in the tank 11 is actuated. The closing of the switch 40 energizes the coil 34 which moves the valve 32 to close the solenoid valve seat 28 to prevent passage of air from the auxiliary tank through passage 27, by pass space around valve 32, chamber 38 and line 39 to the cup shaped recess in the end member 38. When the valve 32 moves to close the seat 28, it opens passage 37 exhausting air from the recess in end member 30 above the diaphragm 29 thereby removing the biasing or pressure from the auxiliary tank which is normally sufficient to overcome the spring 31 and the pressure on the seat 24b. This causes the combined pressure of the spring 31 and the air in the auxiliary tank bearing on the valve 24b on the piston to move the piston 23 axially in the bore 20. The valve 24a then closes the valve seat 20a and air passes out of the auxiliary tank 15 through the hollow nipple 26 into the cup shaped recess in the end member 25 and thence through openings 24c in the diaphragm 24 to the valve outlet 43 and the brake actuating diaphragms 18 on the tractor wheels. So long as the pressure in the main system remains below a safe level the pressure switch remains closed and the brakes are engaged.

In order to permit the vehicle to be moved after the auxiliary system is in operation, the override switch 42 is provided. This switch can be used to control the brakes for moving the vehicle by breaking the circuit through the pressure switch and coil 34 thereby releasing the brakes.

An additional safety is provided in the adjustment of the spring 31. The pressure of spring 31 is selected so that the air pressure in the auxiliary tank 15 cannot be bled down below a safe level by the use of the override switch 42. Since the movement of the piston 23 is dependent upon the pressure from the auxiliary tank overcoming the pressure of the spring 31, this adjustment or selection of springs is relatively simple.

While I have illustrated and described a present preferred embodiment of my invention it will be understood that it may be otherwise embodied within the scope of the following claims.

I claim:

1. A vehicle brake system comprising a source of fluid under pressure, fluid flow control means, brake actuator means receiving fluid from the source of fluid under pressure through the fluid flow control means, a fluid pressure reservoir non-returnably receiving fluid from the source of fluid under pressure, differential pressure valve means movable from closed position connecting the brake actuator means with the fluid pressure reservoir to an open position connecting the source of fluid under pressure to the brake actuator means, said differential pressure valve means including resilient means normally urging the valve to the closed position, fluid pressure actuated operator means acting to overcome said resilient means, connections from the fluid pressure reservoir to said fluid pressure actuated operator means delivering fluid thereto whereby to create a differential pressure on the valve to hold the valve in the open position, solenoid valve means controlling the differential pressure on the fluid pressure actuated operator means, and electrical means responsive to a drop in pressure below a predetermined level actuating the solenoid valve means whereby to close said connections whereby to vary the differential pressure on the fluid pressure actuated operator means whereby the resilient means moves the valve to the closed position shifting the flow of fluid to the brake actuator means from the source of fluid under pressure to the fluid pressure reservoir when the pressure at the source of fluid drops below a predetermined level.

2. A vehicle brake system comprising a source of fluid under pressure, fluid flow control means, brake actuator means receiving fluid from the source of fluid under pressure through the fluid flow control means, a fluid pressure reservoir non-returnably receiving fluid from the source of fluid under pressure, differential pressure valve means movable from closed position connecting the brake actuator means with the fluid pressure reservoir to an open position connecting the source of fluid under pressure to the brake actuator means, resilient means urging the differential pressure valve means to said closed position to prevent flow of fluid from the source of fluid pressure to the brake actuator means and to connect the brake actuator means with the fluid pressure reservoir, fluid pressure actuated operator means acting to overcome said resilient means, connections from the fluid pressure reservoir to the fluid pressure actuated operator means delivering fluid under pressure to the fluid pressure actuated operator means to oppose the resilient means, solenoid valve means controlling the flow of fluid through said connections whereby to normally permit flow of fluid through the differential pressure valve from the source of fluid under pressure to the brake actuator means and electrical means responsive to a drop in pressure of the source of fluid below a predetermined level actuating the solenoid valve means to prevent passage of fluid from the pressure reservoir to oppose the resilient means and to vent the opposing fluid previously passed whereby to cause the valve to prevent flow of fluid from the source of fluid under pressure and open the fluid pressure reservoir to the brake actuator means.

3. A vehicle brake system comprising a source of fluid under pressure, fluid flow control means, brake actuator means receiving fluid from the source of fluid under pressure through the fluid flow control means, a fluid pressure reservoir non-returnably receiving fluid from the source of fluid under pressure, differential pressure valve means movable from a closed position connecting the brake actuator means and the fluid flow control means to an open position connecting the source of fluid under pressure to the brake actuator means, spring means urging the differential pressure valve means to said closed position to prevent flow of fluid from the source of fluid pressure to the brake actuator means, solenoid valve means communicating with the fluid pressure reservoir and delivering fluid therefrom under pressure to oppose the action of the spring means to normally permit flow of fluid through the differential pressure valve from the source of fluid under pressure to the brake actuator means and electrical means responsive to a drop in pressure of the source of fluid below a predetermined level actuating the solenoid valve means to prevent passage of fluid from the pressure reservoir to oppose the spring means whereby to cause the valve to prevent flow of fluid from the source of fluid under pressure and open the fluid pressure reservoir to the brake actuator means.

4. A vehicle brake system comprising a source of fluid under pressure, fluid flow control means, brake actuator means receiving fluid from the source of fluid under pressure through the fluid flow control means, a fluid pressure reservoir non-returnably receiving fluid from the source of fluid under pressure, valve means communicating with the fluid pressure reservoir, said valve means having a central bore, a connection from the source of fluid pressure to the central bore, a chamber connected to one end of the central bore, an outlet in the chamber, a connection from the fluid pressure reservoir to the chamber, first diaphragm means in the chamber between the bore and the outlet, resilient means acting on the first diaphragm whereby said first diaphragm is urged toward the end of the central bore to close it from the outlet, a second diaphragm operator means acting on the first diaphragm means in the chamber in opposition to the resilient means, connections from the fluid pressure reservoir delivering fluid to one side of the second diaphragm in opposition to the resilient means and solenoid valve means in said connections with the fluid pressure reservoir controlling the flow of fluid pressure to act on the second diaphragm overcoming the resilient urging of the first diaphragm whereby the first diaphragm acts to normally close the connection from the fluid pressure reservoir to the outlet and permit flow from the bore to the outlet and electrical means responsive to a drop in pressure of the source of fluid below a predetermined level actuating the solenoid valve means to prevent passage of fluid from the fluid pressure reservoir to oppose the resilient urging on the first diaphragm whereby to cause the first diaphragm to close the bore against flow of fluid when the pressure in the source fluid pressure drops below the predetermined level.

5. A vehicle brake system comprising a source of fluid under pressure, brake actuator means operable by fluid pressure, a fluid pressure reservoir non-returnably receiving fluid from the source, a brake valve housing having a central bore terminating in enlarged recesses at each end, a valve seat at one end of said central bore in one of the enlarged recesses, a connection intermediate the end of said central bore with the source of fluid under pressure, an outlet connection in the enlarged recess having the valve seat, a connection with the fluid pressure reservoir in said enlarged recess in axial alignment with the bore, a valve seat on said connection with the fluid pressure reservoir in said enlarged portion, a closure member axially movable in the central bore having a portion movable from one valve seat to the other valve seat in the enlarged recess, resilient means urging the closure member into contact with the seat on the bore and away from the seat on the connection with the said fluid pressure reservoir, means in the other enlarged recess normally receiving fluid under pressure from the said fluid pressure reservoir and acting on the closure member to overcome the resilient means and normally maintain the closure member in sealing engagement with the seat on the connection with the said fluid pressure reservoir and electrically actuated means interrupting the flow of fluid from the said fluid pressure reservoir to the means acting on the closure member when the pressure in the said source of fluid under pressure drops below a predetermined level and connections from the said one enlarged recess to the brake actuator means whereby said brake actuator is selectively actuated by fluid from the source and from the reservoir.

References Cited in the file of this patent

UNITED STATES PATENTS

| | | |
|---|---|---|
| 1,340,861 | Hellmann et al. | May 18, 1920 |
| 1,428,997 | Thomas | Sept. 12, 1922 |
| 2,091,046 | Hewitt | Aug. 24, 1937 |
| 2,232,883 | Neveu | Feb. 25, 1941 |
| 2,379,181 | Pontius | June 26, 1945 |
| 2,439,523 | Miller et al. | Apr. 13, 1948 |
| 2,444,190 | Fitch | June 29, 1948 |
| 2,680,500 | Jenkins | June 8, 1954 |
| 2,781,870 | Clements | Feb. 19, 1957 |
| 2,845,148 | Sturgill | July 29, 1958 |

FOREIGN PATENTS

| | | |
|---|---|---|
| 523,516 | Great Britain | July 16, 1940 |